United States Patent
Timothy et al.

(10) Patent No.: US 9,275,159 B1
(45) Date of Patent: Mar. 1, 2016

(54) CONTENT MARKING

(75) Inventors: Boyd H. Timothy, Highland, UT (US);
F. Scott Reeves, Lindon, UT (US);
Bruce L. Bergeson, American Fork, UT (US); Kent Cutler Boogert, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 767 days.

(21) Appl. No.: 11/102,963

(22) Filed: Apr. 11, 2005

(51) Int. Cl.
*G06F 17/30* (2006.01)

(52) U.S. Cl.
CPC ............... *G06F 17/30884* (2013.01)

(58) Field of Classification Search
CPC ................................. G06F 17/30884
USPC ......... 707/1–10, 512; 715/206, 241, 744, 229
See application file for complete search history.

(56) References Cited

U.S. PATENT DOCUMENTS

| 5,367,671 | A | * | 11/1994 | Feigenbaum et al. ............ 707/1 |
| 6,032,162 | A | | 2/2000 | Burke |
| 6,173,285 | B1 | | 1/2001 | Nishita et al. |
| 6,314,423 | B1 | | 11/2001 | Himmel et al. |
| 6,324,566 | B1 | * | 11/2001 | Himmel et al. ............... 709/203 |
| 6,526,424 | B2 | * | 2/2003 | Kanno et al. .................. 715/229 |
| 6,551,357 | B1 | * | 4/2003 | Madduri ....................... 715/235 |
| 6,557,028 | B2 | | 4/2003 | Cragun |
| 6,601,173 | B1 | * | 7/2003 | Mohler ............................. 726/7 |
| 6,725,227 | B1 | | 4/2004 | Li |
| 6,782,089 | B1 | | 8/2004 | Blackburn et al. |
| 6,966,038 | B1 | * | 11/2005 | Shaver et al. ................. 715/854 |
| 6,976,209 | B1 | * | 12/2005 | Storisteanu et al. .......... 715/201 |
| 6,978,276 | B2 | * | 12/2005 | Demsky et al. ............... 707/102 |
| 7,100,114 | B1 | * | 8/2006 | Burleson ....................... 715/744 |
| 7,380,280 | B2 | * | 5/2008 | de Jong ............................ 726/27 |
| 7,987,497 | B1 | * | 7/2011 | Giles et al. ....................... 726/2 |
| 2002/0147711 | A1 | * | 10/2002 | Hattori et al. ..................... 707/3 |
| 2003/0074416 | A1 | * | 4/2003 | Bates et al. .................... 709/217 |
| 2004/0148278 | A1 | * | 7/2004 | Milo et al. ......................... 707/3 |
| 2004/0205511 | A1 | * | 10/2004 | Best et al. .................. 715/501.1 |
| 2005/0187895 | A1 | * | 8/2005 | Paya et al. ......................... 707/1 |
| 2006/0242161 | A1 | * | 10/2006 | Ten Kate et al. ............. 707/100 |

OTHER PUBLICATIONS

"About Local Names", http://ln.taoriver.net/, (Dec. 19, 2004),1 pg.

* cited by examiner

*Primary Examiner* — Apu Mofiz
*Assistant Examiner* — Chelcie Daye
(74) *Attorney, Agent, or Firm* — Schwegman Lundberg & Woessner, P.A.

(57) ABSTRACT

Techniques for content marking are provided. An Application includes a plug-in which permits an offset location within a document to be marked as a content marker. The content marker is stored independent of the application and is subsequently processed by a content marking service. The content marking service permits the content marker to be selected causing the application to be initiated, the document to be loaded within the application, and the offset location to be presented within the document.

7 Claims, 3 Drawing Sheets

CONTENT MARKING

FIELD

The invention relates generally to data processing and more particularly to linking and integrating content from a variety of electronic sources.

BACKGROUND

Internet users process and view enormous amounts of electronic information on a daily basis. Moreover, the information may be dynamic and constantly changing. Typically, content associated with the information is presented within World-Wide Web (WWW) browsers, instant messaging (IM) clients, chat rooms, electronic mail (email) systems, word processing editors, image viewers, etc. Whenever a user exits an application (normally or abnormally), the user can potentially lose context associated with information that the user is working with from within a document. This is especially problematic for chat rooms where if an original window is closed or a conversation within a chat room goes too long, it becomes difficult for a user to restore information which originally existed on his/her display screen.

WWW browsers provide bookmark features which permit documents associated with a browser to be recovered on demand. However, with a bookmark the document associated with the bookmark has to be compatible with a WWW browser. Furthermore, the bookmark generally only identifies the document; it does not provide a link to specific location within the document. Additionally, the bookmarks have to be accessed and consumed within the WWW browser; meaning that the bookmarks are dependent upon the WWW browser application. Finally, the bookmarks of one user are not easily shared and/or synchronized with bookmarks of another user. In essence bookmark sharing is a manual process which is limited to tools provided by a particular browser. Also, manual synchronization of shared bookmarks has to occur every time a bookmark changes; and as a practical matter bookmark changes occur frequently.

Other applications, such as email word processing, etc. may also provide bookmark features. These features suffer from the same limitations as WWW browser bookmarks. Thus, conventionally provided bookmarks are useful only within the applications that provide them, do not permit access to specific locations within documents, and do not permit sharing and synchronization of bookmarks across multiple users.

Accordingly, improved techniques for content marking are needed.

SUMMARY

In various embodiments, content marking techniques are presented. More specifically, and in an embodiment, a first reference location associated with a first location within a first document of a first application is received. Further, a second reference location associated with a second location within a second document of a second application is received. A first application identifier, a first document identifier, and the first reference location are associated and recorded as a first content marker record within a content marker data store. Additionally, a second application identifier, a second document identifier, and the second reference location are associated and recorded within a second content marker record of the content marker data store.

DETAILED DESCRIPTION

A "service" can be an application, system, and/or script which are adapted to execute on a processing device or machine. Moreover, the terms "service" and "application" may be used synonymously and interchangeably herein. A "document" includes portions of electronic data which are logically organized and related with one another. Thus, a document may be an electronic file or it may be sub-portions of an electronic file. A document may also be an entire electronic message or sub-portions of a message. Further, a document may be text data, image data, video data, audio data, graphics data, or various combinations of the same. The data of a document does not have to be stored contiguously within the same storage location; although in some cases the data can be store contiguously within the same storage location.

Two applications are considered disparate from one another when they process different native data formats. For example, a GroupWise® mail client (application) processes data in a format that is different from a Gaim system (LINUX/ UNIX IM client). Thus, GroupWise® is a disparate application from Gaim.

Various embodiments of this invention can be implemented in existing network products and services or new custom products or services. For example, in some embodiments, the techniques presented herein are implemented in whole or in part in the iFolder®, Border Manager®, eDirectory®, and/or SuSE® LINUX products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, directory of file system services, browsers, editors, viewers, and/or other services. Any particular architectural layout or implementation presented herein is provided for purposes of illustration and comprehension only and is not intended to limit aspects of the invention.

Figure 1:
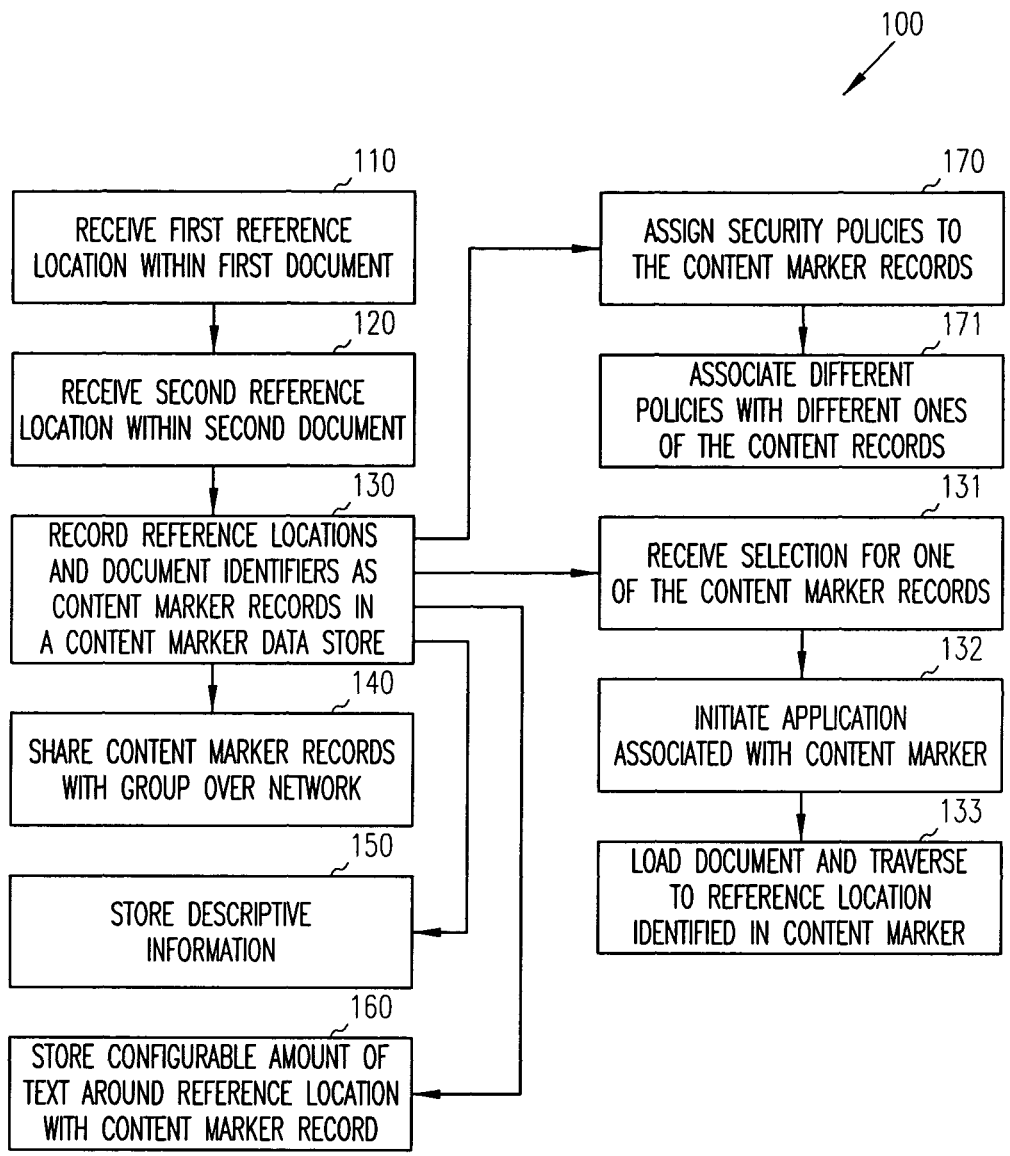
FIG. 1 is a diagram of a method for content marking, according to an example embodiment.

FIG. 1 is a diagram of a method 100 for content marking, according to an example embodiment. The method 100 (hereinafter "content marking service") is implemented in a machine-accessible and readable medium and is optionally accessible over a network. The network may be wired, wireless, or a combination of wired and wireless. In an embodiment, portions of the content marking service are implemented as plug-ins within applications and another portion of the content marking service is an independent standalone service.

At 110, the content marking service receives a first reference location within a first document. The document is simultaneously being processed by a first application (e.g., editor, email, IM, viewer, chat room, browser, etc.). The reference location identifies an offset from the start or the beginning of the first document into the body of the document. In many cases, the application processing a document includes an application programming interface (API) that permits the current focus within a document to be identified as a reference location. The API may also permit the identity of the document to be acquired via API calls. The content marking service may utilize such APIs via plug-ins, which are callable from within the applications for purposes of identifying the reference location and the document. The identity of the plug-in can be used to notify the content marking service of the identity of the application. In other words, a plug-in for Mozilla Firefox® which contacts the content marking service can be used to identify the application associated with the first reference location, which is Mozilla Firefox®. Additionally, in some cases the name of document will include an extension from which the application identity can be inferred (e.g., ".pdf" for an Adobe Acrobat® application, etc.).

At 120, the content marking service receives a second reference location within a second document. The second document is simultaneously being processed by a second application. The manner in which the second reference location is received by the content marking service is similar to what was discussed above with respect to the first reference location. Thus, the second reference location, a second document identifier, and an identity for the second application are all received by the content making service.

Moreover and in an embodiment, the first application and the second application are disparate from one another. For example, if the first application is Mozilla Firefox® then the second application may be a GroupWise® mail client. In other embodiments, the first and second applications are not disparate or are compatible with one another.

At 130, the content marking service records the first and second reference locations, the first and second document identifiers, and identifiers for the first and second applications. All references associated with the first application are logically associated with one another and recorded as a first content marker record within a content marker data store. Similarly, all references associated with the second application are logically associated with one another and recorded as a second content marker record within the content marker data store.

The data store may be a database, a data warehouse having a plurality of databases interfaced with one another, a directory, metadata, an electronic file, and/or various combinations of the same. The content marker records are logical associations which are indexed within and retrieved from the data store.

Once the content marker records are generated and stored, the records may be subsequently consumed from a central location by a user. That is, a user may view the content maker records independent of any particular application. This creates an enhanced, universal, and application-independent bookmark feature that is currently not available in the industry. It is enhanced because the first and second reference locations do not simply identify a document; rather, they identify specific locations within a document. It is universal because it is not tied to a specific application.

It should also be noted that there is no application imposed artificial constraint on the information which may be associated with the content marker. Thus, the content marker may include not only a specific location within a document but may also include any relevant information that may be deemed useful, such as access time, identity of individuals making an access, machines that accesses occurred from, layout or context of surrounding information related to the content marker. In fact, a variety of metadata may be captured and used with the content markers.

Accordingly, at 131, and in an embodiment, the content marking service may receive a selection for one of the content marker records from a user. The selection may be received independent of any particular application. Alternatively, an application-specific plug-in may permit the displaying of the content marker records and may interact with the content marking service. Thus, a content marker selection may occur from within an application or may occur entirely independent of any particular application. Even if the content marker records are displayable or presentable from within an application, they are independent of that particular application and may be used within or for other disparate applications. At 132, upon receiving a selection, the content marking service initiates an appropriate application associated with the selected content marker record. Next, the document associated with the selected record is loaded and the reference location identified in the record is traversed to within the document, such that the user is viewing the reference location of a desired document within a specific application.

As an example, consider a content marker record that includes the following information:

"Word, Tim's Document, Line 2005."

The string "Word" identifies an application namely, Microsoft Word®. The second string "Tim's Document" identifies a particular document, and the string "Line 2005" identifies a particular line or offset within Tim's Document. When this record is selected, the content marking service executes Word® by attempting to open Tim's Document. Next, using an API within Word® the loaded document is traversed to Line 2005. The above example was presented for purposes of illustration only and is not intended to limit the various embodiments presented herein. The exact format of content records and their data values may be altered without departing from the teachings presented herein.

In an embodiment, at 140, the content marker records may be shared over a network with a select group of users. Thus, a single content marker record or a collection of content marker records may be associated with select users that comprise a group and shared over a network. In this manner, content marker records may be shared for purposes of facilitating user or group collaboration.

In another embodiment, at 150, the content marking service may permit user-defined labels or descriptive information to be associated with each content marker record. The descriptive information permits readily recognizable labels or names to be used by a user for purposes of recalling a particular content marker record for later consumption. Descriptive information may also include content maker categories or classifications.

In still another embodiment, at 160, the content marking service may permit a user to store a configurable amount of text or data that is proximate to one of the reference locations within a document. The text may be carried and stored with the content marker record. This can provide a variety of novel benefits.

For example, if a document is subsequently deleted, which was originally associated with a content marker record, and then the context of data that was deemed relevant by the user for that document may still exist within the content marker record. Additionally, the context may be searchable within the content marking data store, such that more descriptive information can be used by a user to find a particular content marker record. Thus, saved context of content marker records provides for enhanced search and retrieval, since the captured descriptive information provides more focused and relevant search terms.

As still another benefit, consider that some content marker records may carry a classification or category reference and by including selective information context from relevant documents, a service can be provided to generate automatic abstracts or summaries for research projects. For example, one or more users may create content marker records with a category of X and include selective text around reference locations within documents for each of the records. A manager could get a quick overview or summary of X by searching the content marking data store for category X and requesting that the selective text be returned. This can occur without opening the disparate applications which may be associated with the content marker records having category X, since the selective text is carried with the content records. This feature may be enhanced by permitting user-defined comments to be carried with the selective text for the content marker records.

In yet another embodiment, at 170, each content marker record may be associated with a security policy. In some cases, at 171, a different security policy may be associated with a different one of the content marker records. In other cases, configurable groupings of content marker records may be associated with the same security policy. Thus, sensitive research may be restricted to particular users or groups within an enterprise by assigning security policies to the appropriate content marker records.

Figure 2:
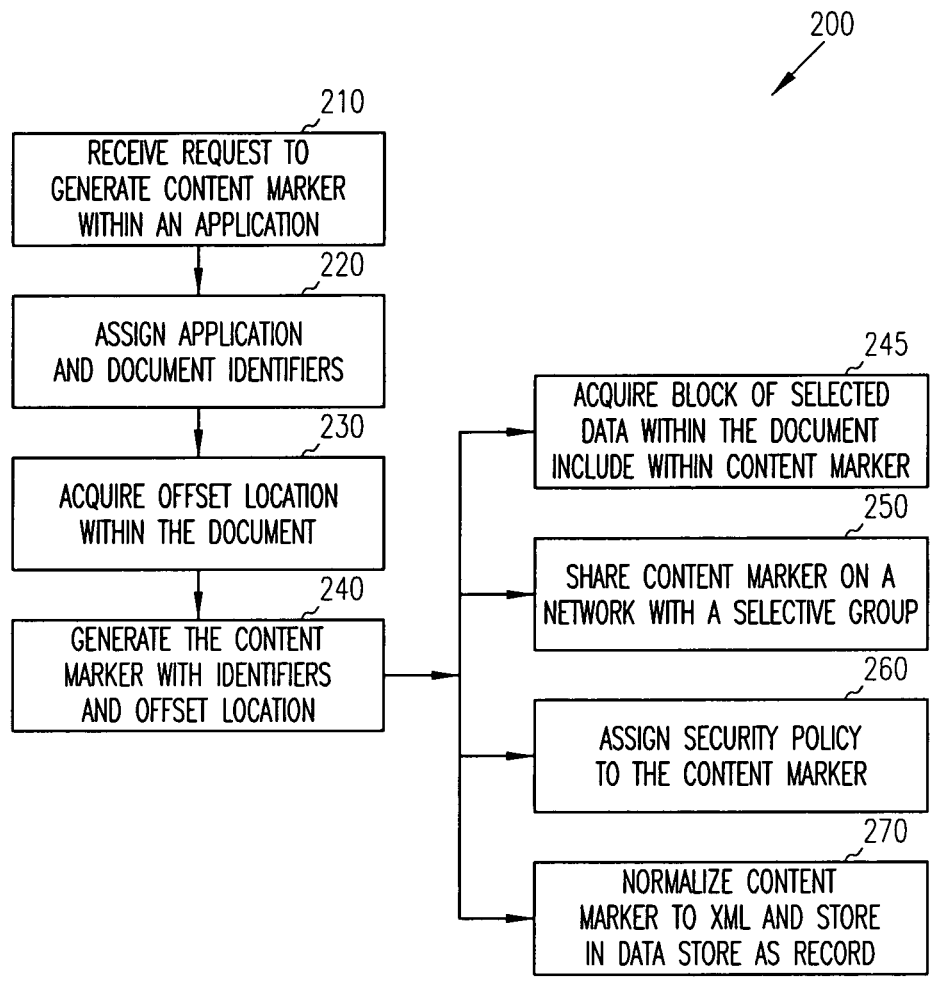
FIG. 2 is a diagram of another method for content marking, according to an example embodiment.

FIG. 2 is a diagram of another method 200 for content marking, according to an example embodiment. The method 200 (hereinafter "plug-in service") is implemented in a machine-accessible and readable medium and is optionally accessible over a network. The network may be wired, wireless, or a combination of wired and wireless. In an embodiment, the plug-in service cooperates with the content marking service, which is represented by the method 100 of FIG. 1, for purposes of forming instances of content marking records. The plug-in service is callable from within a specific application (e.g., editor, viewer, chat room, email, IM, browser, etc.) and interacts with an API of the specific application or an Operating System (OS) to communicate and build information which are defined as the content marking records.

At 210, the plug-in service receives a request to generate a content marker from within an application. The application may be an existing or commercially available application, such as Microsoft Word®, GroupWise®, Mozilla Firefox®, Internet Explorer®, Gaim®, Adobe Acrobat®, Microsoft Outlook®, etc. Alternatively, the application may be a custom-developed editor, browser, chat room application, email client, IM client, and/or viewer.

The plug-in service may directly or indirectly integrate within the application in a variety of manners. For example, the plug-in service may be an integrated feature that is included within the source of the application. Alternatively, the plug-in service may be a macro, which is accessible from menu screens of the application. In this latter embodiment, the plug-in service does not have to be integrated within the source of the application to be accessible from a menu of the application. In yet another circumstance, the plug-in service may be entirely external to the application and accessed from a different standalone interface which is independent of the application and once executed the plug-in service interfaces with an API of the application or with an API of an OS that is running the application.

At 220, the plug-in service uses an API of the application or an OS to assign application and document identifiers to the request for generating a content marker. The application identifier may be inferred by the identity of the plug-in service or by the extension of a document. For example, a plug-in service for a Novell GroupWise® email client assumes the application identifier is a GroupWise® execution module reference.

At 230, the plug-in service acquires an offset location within the identified document associated with the request for generating the content marker. Again, the offset syntax and content may be acquired via an application API or via an OS API.

Once the plug-in service has the application and document identifiers and the offset location, at 230, the plug-in service is in a position to generate the content marker. The content marker is a data structure, such as a database record or a custom-defined object and the data structure or object includes an application identifier, a document identifier, and the offset location within a document associated with the document identifier. The content marker is housed or recorded in an application independent location and may be consumed or processed by a content marking service, such as the content marking service represented by the method 100 of FIG. 1. At 240, the content marker is generated with identifiers and an offset location within the document.

In an embodiment, at 245, the plug-in service may also permit a block of selected data from within a document to be included with the content marker. A situation such as this was discussed above with respect to the content marking service of FIG. 1. Furthermore, at 250, the plug-in service may be used to identify a content marker as being sharable across one or more selective groups. Additionally, at 260, the plug-in service may be used to assign or communicate preferences for a security policy associated with the content marker.

According to an embodiment, at 270, the plug-in service may also normalize the information which comprises the content marker into an independent and intermediate data format, such as extensible markup language (XML). The XML-formatted content marker may then be stored within a content marker data store as a content marker record and consumed by a variety of other services. The intermediate data format permits a content marking service (such as the one described in FIG. 1) to process and work with a single data format and syntax for a plurality of disparate applications. Each data record may be subsequently retranslated back into a native application format when needed through the use of an extensible style sheet (XSL) and/or an XSL transform application referred to as XSLT. In some instances, this may even permit a content marker associated with one application, such as Word®, to be opened with an entirely different application, such as Word Perfect®. This situation may occur when a user interacting with a content marking service does not have an application to open a content marker but has the document and has another application that may be made compatible through a translation process. The translation process may be embodied within customized translators.

One now appreciates how a plug-in service may be interfaced to an application and to a content marking service for purposes of capturing information relevant to a content marker. Users of applications may now access a variety of applications and documents and centrally capture and record content markers through the use of plug-in services. This integrates and organizes information for users across a variety of data formats and disparate applications. The content makers that are generated may also be shared with other users or groups of users over a network. Thus, users can collaborate with other users through shared content markers. Moreover, the content markers may include security constraints and may carry contextual information from the documents with which they are associated. This further enhances the usefulness of the content markers to the users.

Additionally, the content markers taught herein are more than an offset to a specific location within a document. That is, custom metadata generated by applications, users, and/or the content marking service may be included with each content marker.

Figure 3:
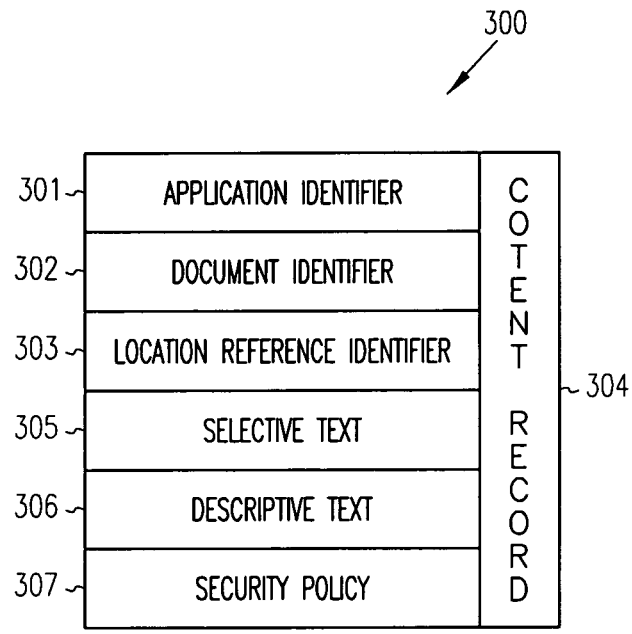
FIG. 3 is a diagram of a content marking data structure, according to an example embodiment.

FIG. 3 is a diagram of a content marking data structure 300, according to an example embodiment. The content marking data structure 300 is implemented in a machine-accessible or readable medium. In an embodiment, the content marking data structure 300 is generated by the plug-in services represented by the method 200 of FIG. 2 and consumed or processed by a content marking service, such as the content marking service represented by the method 100 of FIG. 1.

The content marking data structure 300 includes an application identifier 301, a document identifier 302, a location reference identifier 303, and a content marker record 304. In some embodiments, the content marking data structure 300 may also include selective text information 305, descriptive text information 306, and/or a security policy 307. Each of these will now be discussed in turn.

The application identifier 301 identifies a field within the content marker record 304 that houses a value for identifying an application. The application identifier value may include the executable reference or name for a specific application. The application identifier value is captured when a plug-in service associated with a specific application generates a content marker record 304 for a user-defined content marker.

The application identifier 301 may also be used as a multi-valued field. Thus, a single content marker 304 may include multiple applications that can be used to open the document. The multiple entries may be used to identify a preference application or to identify which application originally generated the application identifier 301. For example, a Mozilla browser could generate a Mozilla specific bookmark that may include some generic information, such as URL and access time. A subsequent Internet Explorer browser could use the generic information to include it in an Internet Explorer bookmark list or display. On access, the Internet Explorer may update the access time generic information and add its own Internet Explorer specific information. Thus, the application identifier 301 can include multiple entries for multiple applications. In the present example, the application identifier field 301 may include an entry for Mozilla and a separate entry for Internet Explorer.

In a similar manner, the document identifier 302 is a field within the content marker record 304 that houses a value for identifying a document. The document identifier value may be a file name, message name, etc. In some embodiments, a file name that is used as a document identifier value may also be used to infer the application identifier value. For example, a file name of "mydocument.doc" includes an extension of ".doc" this may be used for automatically determining that the application identifier value is Microsoft Word®.

The location reference identifier 303 is also another field within the content marker record 304. A value associated with this field identifies a specific offset location within a document which is to be associated with a content marker. This may be a line number, paragraph number, page number, etc. In some cases, the format of values associated with the location reference identifier 303 field is dependent upon the API of the application that was originally processed to capture a content marker. Thus, for Word® the location reference identifier value may be a page number. In other cases, the document itself may be natively modified to include a reference link. The reference link may be hidden or non-viewable from within the document and used by a content marking service to link a content marker to a specific location within a document. For example, a Hyper Text Transfer Protocol (HTTP) document may be altered to include and embed a "#HREF=N" tag that is not displayed within a browser screen but which provides a link to specific location (N) within the document, where N is automatically generated as a unique string within the document.

The content marker record 304 logically associates the fields 301-303 and 305-307 with specific values. The specific values are generated from plug-in services, such as the plug-in service of FIG. 2. The content marker record 304 is a content marker which is separated from a specific application from which it may depend and may be combined with other instances of content marker records 304 which span multiple disparate applications. Thus, the content marker record 304 is a mechanism for facilitating a universal bookmark to information which spans multiple applications and potentially multiple environments.

The content marker record 304 may be shared with a plurality of select users or groups over a network. Moreover, in an embodiment, the content marker record 304 also includes a selective text field 305 and selective text information associated with that field. Selective text may be user-defined text selected from a document and carried with the content marker record 304. In some cases, the selective text may be user-generated. This means that a user may wish to add his/her editorial comments or instructions for a particular content marker. This editorial information may also be combined with other text that is extracted from the document and carried within the content marker record 304.

In another embodiment, the content marker record 304 may also include a descriptive text field 306 having a user-defined value. The descriptive text permits a user to custom-define a particular instance of the content marker record 304. In some cases, this may actually be text that is searchable or presented to users when interacting with instances of the content marker record 304. In other instances, the descriptive text may be a category or classification for a content marker record instance 304. The category or classification may be flat (single dimension) or hierarchical (multidimensional) in nature.

In still another embodiment, the content marker record 304 may also include a security policy field 307 having a value assigned by a user or assigned by an administrator or an automated service based on the identity of the user. The security policy may restrict or permit viewing of the entire content record 304 or may selectively restrict or permit viewing of selective fields 301-303 and 305-307 of the content marker record 304.

The content marker record 304 may be indexed and housed in a data store. This permits subsequent search, retrieval, and browsing of the multiple instances of content marker records 304. The multiple content marker records 304 may be grouped together in collections and selectively shared over a network between users or groups of users. However, in some embodiments, the multiple content marker records 304 may be specific to a single user and not shared over a network with other users; but the single user may access the content marker records 304 over a network from any machine when properly logged into a service providing and managing the content marker records 304 on behalf of the single user.

Once a content marker record 304 is populated it may be consumed by a content marking service, such as the service depicted above in FIG. 1. Thus, if a user selects the content marker record 304 within a content marking service, the application associated with the application identifier field 301 is initiated or executed, the document associated with the document identifier field 302 is loaded within the application, and the view within the application is traversed or moved to the reference location associated with the reference location identifier field 303. This process can be initiated outside the application via the content marking service using its processing for the content marker record 304.

Figure 4:
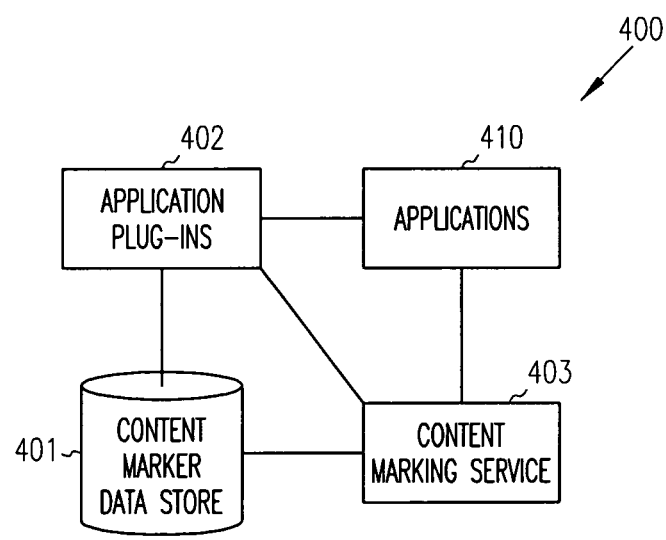
FIG. 4 is a diagram of a content marking system, according to an example embodiment.

FIG. 4 is a diagram of a content marking system 400, according to an example embodiment. The content marking system 400 is implemented in a machine-accessible and readable medium and is optionally accessible over a network. The network may be wired, wireless, or a combination of wired and wireless. In an embodiment, the content marking system 400 implements, among other things, the methods 100 and 200 of FIGS. 1 and 2 and manages/consumes instances of the content marker data structure 300 of FIG. 3.

The content marking system 400 includes a content marker data store 401, one or more application plug-ins 402, and a content marking service 403. The content marker data store 401 houses instances of content markers generated by users. An example content marker data structure 300 (content marker) was presented above with respect to FIG. 3. The content markers include references to specific applications 410, specific documents, and specific locations within those documents that were identified by users while the users were processing the specific applications 410.

The application plug-ins 402 are integrated or interfaced to applications (e.g., editors, viewers, chat room, email, IM, browsers, etc.) 410 for purposes of acquiring or capturing the information associated with content markers when instructed to do so by a user. The plug-ins 402 may be viewable and callable from within menu options associated with the applications 410. In this case, the plug-ins 402 may be externally referenced from within the applications 410, such that the plug-ins 402 are not integrated within the source of the applications 410 but may be called or referenced from within menus of the application (e.g., open macro, etc.). Alternatively, the plug-ins 402 may exist as separate services, which a user may process independent of the applications 410 while the applications 410 are executing. The plug-ins 402 interact with APIs of the applications 410 or an OS for purposes of acquiring information to construct the content markers. The plug-ins 402 generate, based on user direction, content markers that are stored or recorded in the content maker data store 401.

The content making service 403 is adapted to consume and process the content markers. Thus, the content marking service 403 may permit a user to search the content maker data store 401 using search terms for desired content markers based on user-defined constraints. The content marking service 403 may also permit a user to browse different collections of content markers. The collections may be defined based on profiles, names, hierarchies, categories, classifications, or other information.

Additionally, the content marking service 403 initiates or executes the applications 410 when a user selects a specific content marker from the content marker data store 401. In addition, the content marking service 403 causes the applications to load the appropriate documents associated with the selected content markers and to traverse to the proper offset or reference locations defined in the selected content markers. This may be done by communicating with the plug-ins 402 that have knowledge about each application's 410 API or may be achieved by directly using each application's 410 API.

It is now appreciated how content may be marked within documents in a centralized manner, such that information contained within the documents may be readily referenced when desired. The documents may span disparate applications and the references may refer to specific locations with those documents. Techniques presented herein permit this information to be generated and housed as content markers and subsequently consumed or processed to facilitate recall of that information.

Additionally, the content markers may include a variety of custom-generated metadata. The metadata may be manually added by users, added by applications, and/or added by content marking services.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable storage medium and to execute on a processing device for performing the method, comprising:

receiving, via a first plugin to a first application, a first reference location within a first document associated with the first application, a first application identifier, and metadata added by at least one of a user, the first application, and the first application plugin;

receiving, via a second plugin to a second application, a second reference location within a second document associated with a second application, a second application identifier, and metadata added by at least one of a user, the second application, and the second application plugin;

recording the first and second reference locations along with a first document identifier and a second document identifier for the first and second documents, respectively, first application identifier and the second application identifier of the first and second applications, respectively, and the received metadata, the reference locations, the document identifiers, and the application identifiers recorded within a content marker data store as content marker records and that span multiple applications, including the first and second applications, and that span multiple environments;

associating a same security policy for configurable groupings of the content marker records that selectively permits viewing of selective fields of the content marker records based on an identity assigned to a requesting user of the content marker records, the security policy assigned by an automated service and included within the content marker records, and wherein the security policy is identified within a security policy field of the content marker records; and wherein the first and second applications are disparate applications that process different native data formats that are augmented with the first and second plugins, respectively, to create and consume application-independent content marker data store data to present a reference location of a document of the content data store data.

2. The method of claim 1 further comprising, sharing the content marker data records with a select group over a network.

3. The method of claim 1 further comprising:
receiving a selection of one of the content marker records for the first reference and the first document identifier;
initiating the first application;
loading the first document within the first application; and
traversing to the first reference location within the first document.

4. The method of claim 1 further comprising, assigning security policies for accessing the content marker data records.

5. The method of claim 1, wherein assigning further includes associating different ones of the security policies with different ones of the content marker records.

6. The method of claim 1 further comprising, associating and storing a configurable amount of data proximate to the first reference location within the first document with the first reference location and the first document identifier within one of the content marker records.

7. The method of claim 1 further comprising, storing descriptive information for the first reference location and the first document identifier within one of the content marker records.

* * * * *